No. 669,807. Patented Mar. 12, 1901.
R. RATHKE.
SHAFT ALINING DEVICE.
(Application filed Apr. 30, 1900.)
(No Model.) 2 Sheets—Sheet 1.
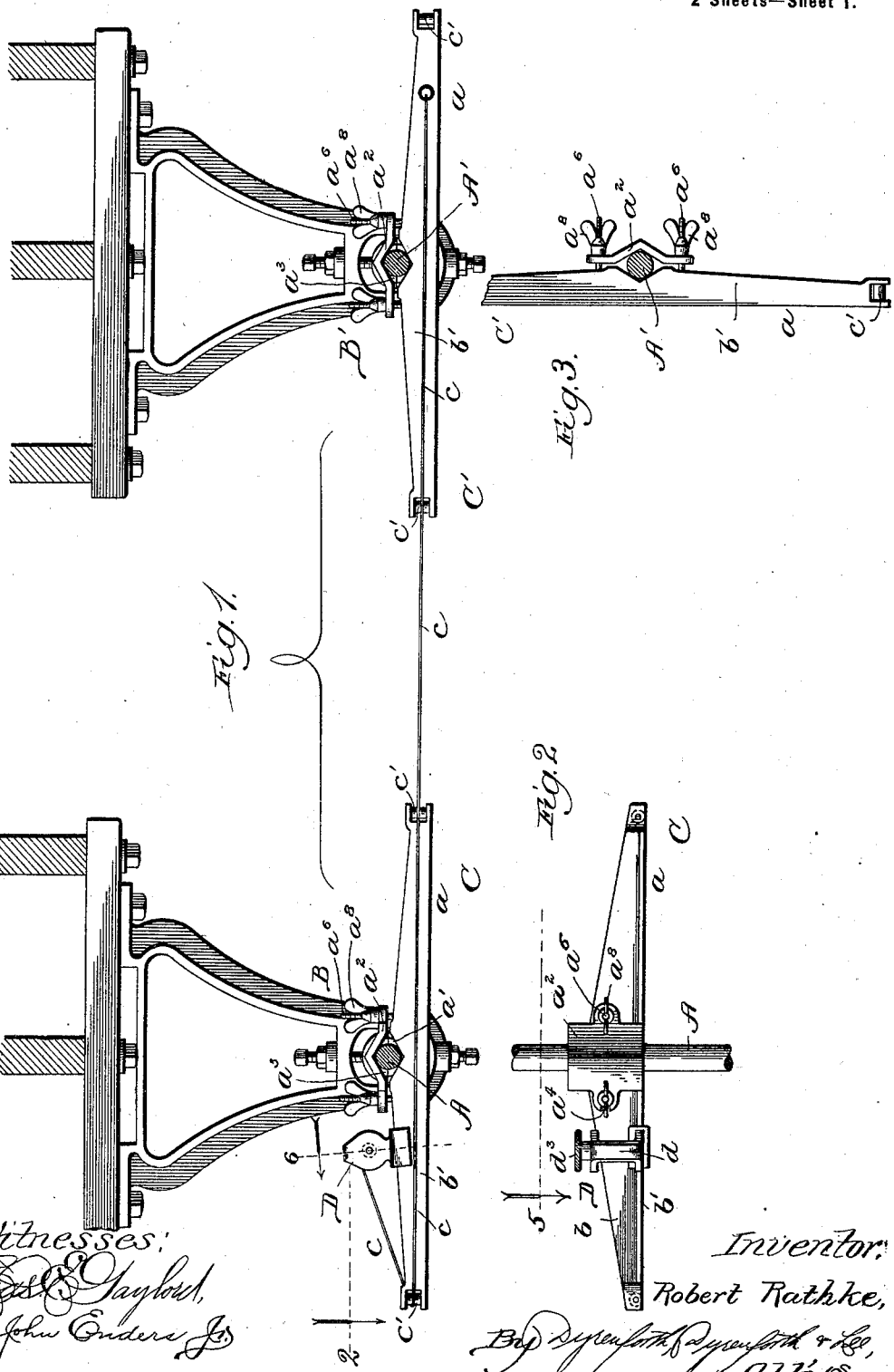
Witnesses:
Inventor:
Robert Rathke, No. 669,807. Patented Mar. 12, 1901.
R. RATHKE.
SHAFT ALINING DEVICE.
(Application filed Apr. 30, 1900.)
(No Model.) 2 Sheets—Sheet 2.
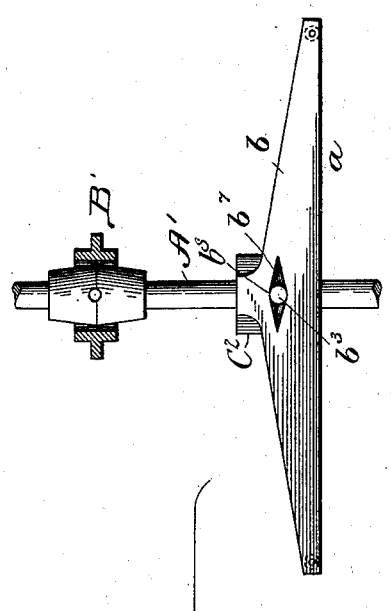
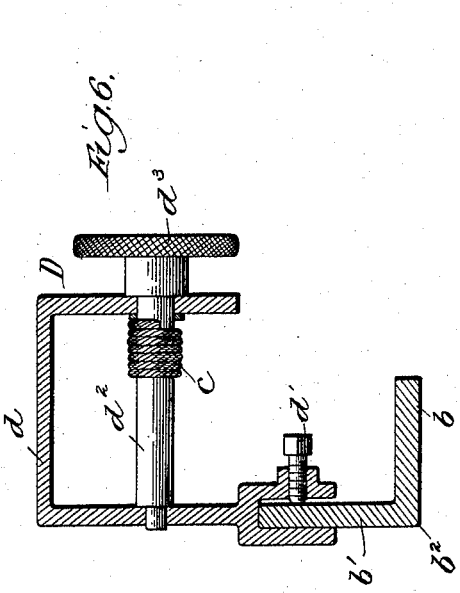
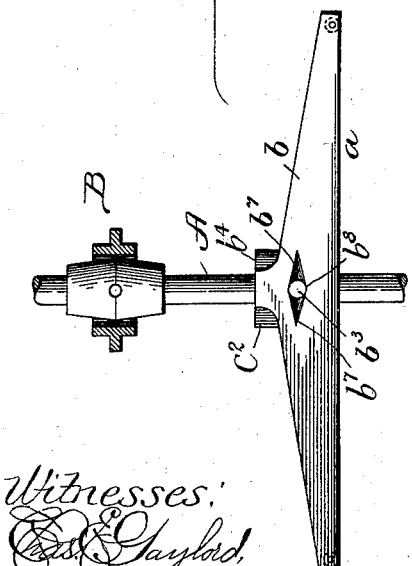
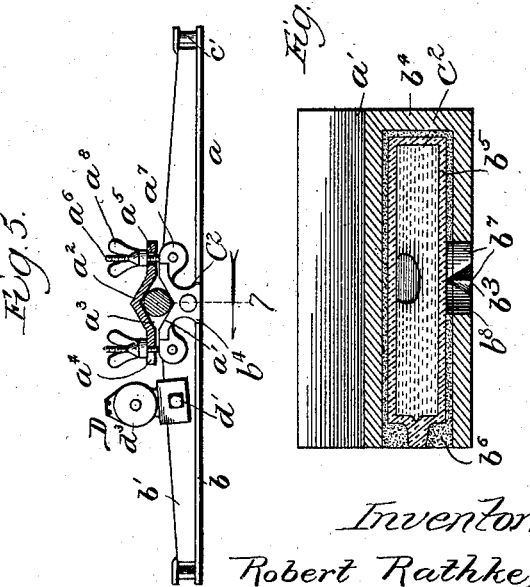
Witnesses:
Inventor:
Robert Rathke,

UNITED STATES PATENT OFFICE.

ROBERT RATHKE, OF CHICAGO, ILLINOIS.

SHAFT-ALINING DEVICE.

SPECIFICATION forming part of Letters Patent No. 669,807, dated March 12, 1901.

Application filed April 30, 1900. Serial No. 14,900. (No model.)

*To all whom it may concern:*

Be it known that I, ROBERT RATHKE, a citizen of the United States, residing at Chicago, in the county of Cook and State of Illinois, have invented a new and useful Improvement in Shaft-Alining Devices, of which the following is a specification.

My invention relates particularly to means for alining shafts and giving them a true horizontal position.

My object is to provide a simple and efficient device of this character capable of ready attachment to and detachment from the shaft, and by means of which shafts may be alined and brought into true horizontal positions at practically one operation.

In the accompanying drawings, Figure 1 represents two suitably-supported shafts, each of which is equipped with an alining device; Fig. 2, a broken plan view taken as indicated at line 2 of Fig. 1; Fig. 3, a broken section taken transversely of a shaft and showing one of the alining arms in a vertical position; Fig. 4, a view of the construction shown in Fig. 1, the point of vision being below the shafts; Fig. 5, a section taken at line 5 of Fig. 2; Fig. 6, an enlarged section at line 6 of Fig. 1 and showing in detail a reel employed, and Fig. 7 an enlarged section at line 7 of Fig. 5 and showing in detail a spirit-level employed.

A A' represent the shafts to be alined, B B' bearings for said shafts, and C C' alining devices applied to the shafts.

Each alining device comprises an arm $a$, provided with a transverse shaft-receiving groove $a'$, preferably located at the center of said arm; a clamping-piece $a^2$, having a shaft-receiving groove $a^3$, an end slot $a^4$, and an end perforation $a^5$; bolts $a^6$, pivoted to lugs $a^7$ on the arm $a$ and provided with winged nuts $a^8$, and a level $C^2$, preferably located directly beneath and parallel to the slots $a'$ and $a^3$. The arm $a$ is preferably an angle-iron having wings $b\ b'$, which meet to form a straight corner-line at $b^2$, as shown in Fig. 6, and which have double sloping free edges whereby the wings are widened at their centers. The wing $b$ is provided with a perforation $b^3$ for viewing the bubble of the level. As shown in Fig. 7, a suitable transversely-extending lug $b^4$ is provided at the center of the arm $a$ to receive the groove $a'$ and the level $C^2$. This lug is bored parallel to the groove $a'$ to afford a receptacle for the sealed glass tube $b^5$ containing a suitable spirit. The tube is fixed in place by plaster-of-paris filling $b^6$. Grooves or notches $b^7$ and $b^8$ serve to indicate the center of the level for the two directions.

From a view of Fig. 4 it will be understood that when an arm is clamped to a shaft the level is in a proper position to indicate when the shaft is horizontal. When each of the shafts to be alined is supplied with an alining device or "square," as it may be termed, said squares may be brought into alinement by means of a straight-edge.

In Fig. 1 I have shown the wing $b'$ of one of the arms $a$ equipped with a reel D, supplied with a cord $c$. The ends of the arms $a$ are provided with rollers $c'$. The reel D comprises a frame $d$, which is secured to the wing $b'$ by a set-screw $d'$, and a spindle $d^2$, journaled in said frame and operated by a handle $d^3$. The spindle is on the same side of the wing $b'$ as is the wing $b$, so that the cord $c$ may be passed about one roller of the arm, across the square face of said arm to the other roller, and thence to the square face of the arm on the other shaft. The cord may be drawn tight and the arms on the two shafts brought into the same vertical plane by means of the cord, in lieu of a straight-edge, as indicated in Fig. 1.

The manner of attachment to the shaft and the mode of operation are evident from the foregoing description. The devices are readily attached, and by their means the shafts may be quickly leveled and alined.

In removing the device from the shaft it is only necessary to unscrew the nut at the slotted end of the member $a^2$ sufficiently to permit it to slip over the end of said member as its pivoted bolt is swung outwardly. When the slotted end of said member is released, the member swings up about the pivot of the bolt at its opposite end.

In Fig. 1 the cord $c$ is illustrated as being drawn from the reel D across the straight-edge surfaces of the two alining devices. In practice the cord will be drawn so as to contact with the two rollers of each device, and it is to be understood that where the rollers $c'$ are accurately perpendicular to the shaft-receiving grooves they may project slightly beyond the straight-edge surfaces and form the only points of contact with the cord. In such case the roller-surfaces of the devices serve in lieu of the straight-edge surfaces to receive the cord and bring the arms into proper alinement. Of course it is only where the shafts are close together that a rigid straight-edge piece may be as advantageously employed as is the cord, whereas in the majority of instances the shafts to be alined are located at considerable distances apart. Indeed, one of the distinct advantages of the improved device arises from the fact that it is very readily employed where the shafts are a great distance apart, the resulting alinement being perfect.

In Fig. 1 the arms are shown beneath shafting supported from a ceiling. Where the shafting is low enough to make it readily accessible, it is preferable to locate the arms above the shafting. The feature of having the shaft-receiving groove located centrally of the length of the arm is of distinct advantage in many ways. The device balances readily upon the shaft and may be secured loosely upon the shaft, so that the shaft can turn within the groove, while the effect upon the arm and level is noted. Moreover, when the arm is securely clamped to the shaft the two projecting ends may be employed for the purpose of rotating the shaft. Again, the reel D may be secured to either projecting end of either device, which renders the device capable of ready use on either side of a journal box or pulley. Finally, a greater distance between the rollers of each arm is secured by having the device of the form shown, thereby rendering the alining operation more easy and certain. Also the two devices may be used with perfect interchangeability and in the different positions stated.

What I claim as new, and desire to secure by Letters Patent, is—

1. A device for use in shaft-alinement, comprising a straight-edge arm provided with a transverse shaft-receiving groove, and means for securing said arm to the shaft, said arm serving to receive an alining member parallel to its straight-edge surface, substantially as and for the purpose set forth.

2. In a shaft-alining device, the combination of a straight-edge arm provided with a transverse shaft-receiving groove, and a clamping-piece secured thereto and provided with a shaft-receiving groove, said arm serving to receive an alining member parallel to its straight-edge surface, substantially as and for the purpose set forth.

3. In a shaft-alining device, the combination of a straight-edge arm provided centrally of its length with a transverse shaft-receiving groove, and means for clamping said arm to the shaft, said arm serving to receive an alining member parallel to its straight-edge surface, substantially as and for the purpose set forth.

4. In a shaft-alining device, the combination of a straight-edge arm, means for securing said arm rigidly at right angles to a shaft, and a level carried by and rigid with said arm and disposed at right angles thereto, substantially as and for the purpose set forth.

5. In a device for alining shafts, the combination of a straight-edge arm, means for securing said arm to a shaft rigidly at right angles thereto, a reel secured to said arm, and a cord upon said reel, substantially as and for the purpose set forth.

6. In a shaft-alining device, the combination of an arm provided centrally of its length with a transverse shaft-receiving groove, a clamping-piece for securing said arm to the shaft, rollers journaled in the ends of said arm, a reel carried by said arm, and a cord upon said reel, substantially as and for the purpose set forth.

7. In a shaft-alining device, the combination of an arm provided centrally of its length with a transverse shaft-receiving groove, a clamping-piece provided with a corresponding shaft-receiving groove, bolts pivoted to said arm and engaging said clamping-piece, and nuts on said bolts, substantially as and for the purpose set forth.

8. In a shaft-alining device, the combination of an arm provided with a straight-edge surface, which in use is perpendicular to the shaft, means for securing said arm centrally of its length rigidly at right angles to a shaft, rollers journaled in the ends of said arms on pivots parallel to said surface, a reel secured to the arm, and a cord passing from said reel about one of said rollers and across the other roller, substantially as and for the purpose set forth.

ROBERT RATHKE.

In presence of—
  D. W. LEE,
  A. D. BACCI.